United States Patent
Kothandaraman et al.

(10) Patent No.: US 11,526,695 B2
(45) Date of Patent: Dec. 13, 2022

(54) EVALUATING IMPACT OF PROCESS AUTOMATION ON KPIS

(71) Applicant: ACCENTURE GLOBAL SOLUTIONS LIMITED, Dublin (IE)

(72) Inventors: Ramkumar Kothandaraman, Bangalore (IN); Koduvayur Vaidyanathan Ramesh, Bangalore (IN); Puneet Kalra, Bangalore (IN); Sunil Balugari, Bangalore (IN); Sudeep Sharma, Bangalore (IN); Sachin Premnath, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1188 days.

(21) Appl. No.: 16/034,962

(22) Filed: Jul. 13, 2018

(65) Prior Publication Data
US 2020/0019822 A1    Jan. 16, 2020

(51) Int. Cl.
*G06Q 10/06* (2012.01)
*G06Q 30/02* (2012.01)
(Continued)

(52) U.S. Cl.
CPC ......... *G06K 9/6262* (2013.01); *G06F 3/0482* (2013.01); *G06F 11/34* (2013.01);
(Continued)

(58) Field of Classification Search
CPC ....... G06Q 10/06375; G06Q 10/06393; G06Q 30/0203
See application file for complete search history.

(56) References Cited

U.S. PATENT DOCUMENTS 8,311,863 B1   11/2012   Kemp
9,208,463 B1   12/2015   Bhide et al.
(Continued)

FOREIGN PATENT DOCUMENTS

EP    2073159 A2 *   6/2009   ............... C12N 1/22

OTHER PUBLICATIONS

D. Palacios and R. Barco, "Unsupervised Technique for Automatic Selection of Performance Indicators in Self-Organizing Networks," in IEEE Communications Letters, vol. 21, No. 10, pp. 2198-2201, Oct. 2017, doi: 10.1109/LCOMM.2017.2728012. (Year: 2017).*

*Primary Examiner* — Mehmet Yesildag
*Assistant Examiner* — Jeremy L Gunn
(74) *Attorney, Agent, or Firm* — Mannava & Kang, P.C.

(57) ABSTRACT

An AI-based process monitoring system access a plurality of data sources having different data formats to collect and analyze KPI data and shortlist KPIs that are to be used for determining the impact of automation of an automated process or sub-process. Information regarding an automated process is received and KPIs associated with the process and sub-processes of the process are identified. The identified KPIs are put through an approval process and the approved KPIs are presented to a user for selection. The user-selected KPIs are evaluated based on classification, ranking and sentiments associated therewith. The evaluations are again presented to the user along with a set of questionnaires wherein each of the questions has a dynamically controlled weight associated therewith. Based at least on the weights and user responses, a subset of the evaluated KPIs are shortlisted for use in evaluating the impact of process automation.

18 Claims, 13 Drawing Sheets

(51) Int. Cl.
*G06K 9/62* (2022.01)
*G06N 20/00* (2019.01)
*G06F 11/34* (2006.01)
*G06F 3/0482* (2013.01)
*G06F 16/951* (2019.01)
*G06F 40/20* (2020.01)
*G06F 16/2457* (2019.01)
*G06F 16/21* (2019.01)
*G06N 20/10* (2019.01)
*G06N 5/00* (2006.01)
*G06N 20/20* (2019.01)

(52) U.S. Cl.
CPC ...... *G06F 16/212* (2019.01); *G06F 16/24578* (2019.01); *G06F 16/951* (2019.01); *G06F 40/20* (2020.01); *G06K 9/6267* (2013.01); *G06N 5/003* (2013.01); *G06N 20/00* (2019.01); *G06N 20/10* (2019.01); *G06N 20/20* (2019.01); *G06Q 10/067* (2013.01); *G06Q 10/06375* (2013.01); *G06Q 10/06393* (2013.01); *G06Q 30/0203* (2013.01)

(56) References Cited

U.S. PATENT DOCUMENTS

| | | | | |
|---|---|---|---|---|
| 9,294,361 | B1* | 3/2016 | Choudhary | G06F 3/0484 |
| 11,120,364 | B1* | 9/2021 | Gokalp | G06N 20/00 |
| 2015/0039401 | A1* | 2/2015 | Ricketts | G06Q 10/06393 |
| | | | | 705/7.39 |
| 2015/0206074 | A1* | 7/2015 | Miller | G06Q 40/00 |
| | | | | 707/792 |
| 2016/0140474 | A1* | 5/2016 | Vekker | G06Q 10/06393 |
| | | | | 705/7.39 |
| 2017/0212957 | A1* | 7/2017 | Voleti | G06F 16/951 |
| 2018/0374374 | A1* | 12/2018 | Watson | G09B 5/14 |

* cited by examiner

EVALUATING IMPACT OF PROCESS AUTOMATION ON KPIS

BACKGROUND

Artificial Intelligence (AI) is one of the tools being used in developing the digital labor of the future. Combined with Robotic Process Automation (RPA), AI has the potential to change the way processes are handled in general. RPA can be used to observe, and learn, what people are actually doing, and automate those patterns so that mechanical, repetitive work is handled by the machines rather than human workers. Machine learning (ML) can be applied during process execution to, for example, trigger a new process or reroute running processes according to predictions. As more complex processes are automated, data regarding the processes is recorded to handle the complications. AI permits applications handling the processes to record and analyze their own historical patterns and flag future constraints that are not easily perceived by a human observer. Process Key Performance Indicators (KPIs) measure the effectiveness of a process and aid personnel in making resource allocations to the various process stages. A KPI is a measurable attribute of a process that is indicative of how effective the process is in achieving its goals.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
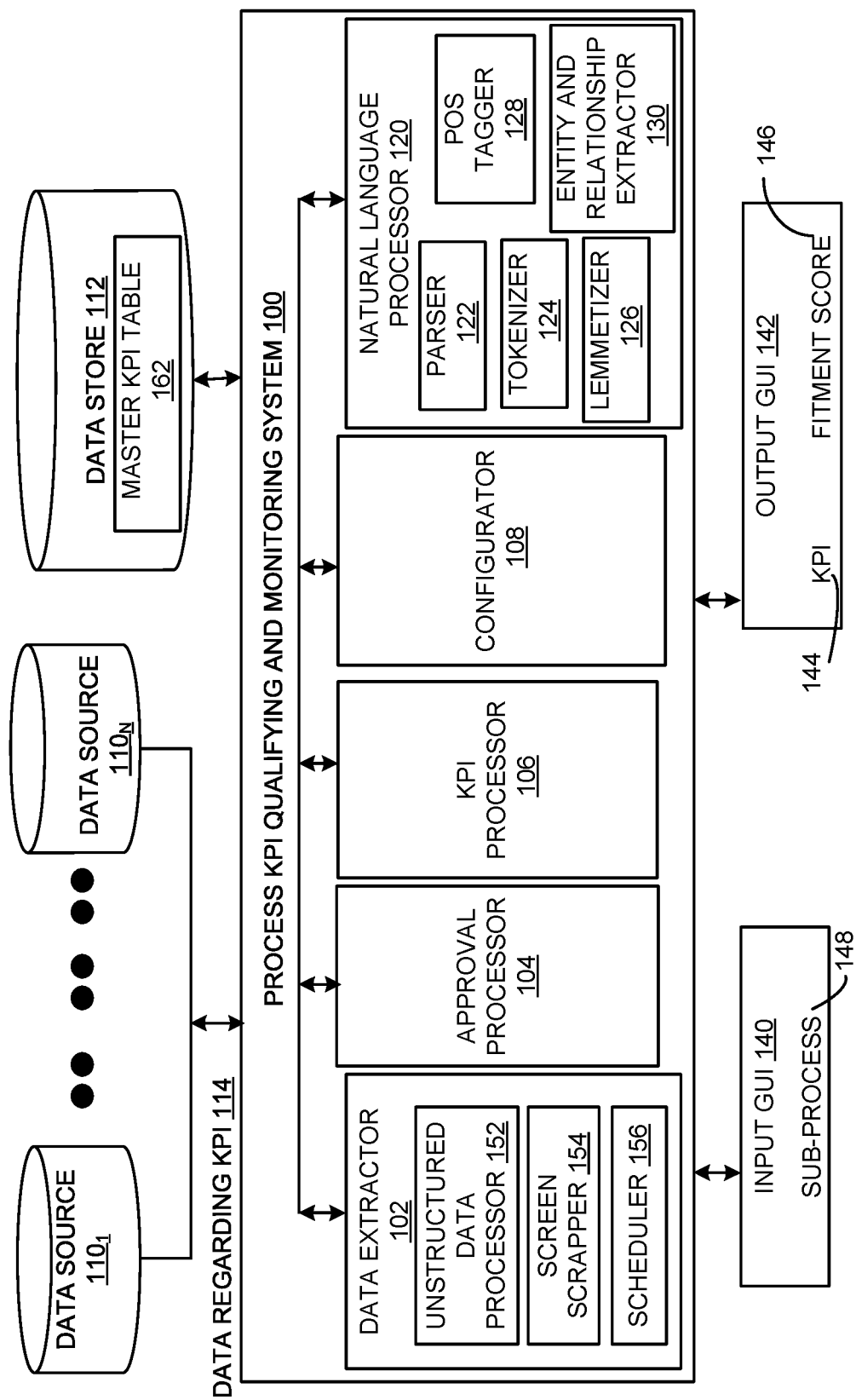
FIG. 1 illustrates a block diagram of an AI based process KPI qualifying and monitoring system in accordance with examples disclosed herein.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based process KPI qualifying and monitoring system is disclosed which receives information regarding an automated process, gathers data regarding the KPIs from a plurality of data sources and employs AI methodologies to select those KPIs that are most accurate in determining the impact of automation on the automated process. A process can include a procedure of information processing with the information or data gathered from various information sources. An automated process is an information or data processing procedure which is either currently carried out by one or more computing devices or which is selected for execution on the computing devices so that it will be executed in a completely automatic manner or in a semi-automatic manner with minimal human supervision. The automated process can include one or more sub-processes which are also automated or executed by the computing devices. For example, the process can be adapted for implementing RPA or using bots for appropriate tasks.

Processes are generally automated to increase efficiency and accuracy. The performance of an automated process can be monitored in order to determine the increase in one or more of the efficiency and accuracy resulting from the automation. Moreover, automation elements such as bots and the like are available 24×7 thereby enormously increasing the productivity. The process monitoring can involve monitoring numerical values of certain process attributes such as the KPIs. However, depending on the nature of the processes or sub-processes, particular KPIs can more effectively determine the impact of automation than other KPIs. The usability of the KPIs for judging a process/sub-process can be based on certain KPI selection criteria. As such KPIs which have direct impact and KPIs which are quantifiable, baselined, reliable and aligned can be selected. The process KPI qualifying and monitoring system can be configured to obtain information regarding the automated process and additional data regarding KPIs associated with the automated process to identify one or more KPIs that can be selected to determine the impact of the automation on the process performance.

The process KPI qualifying and monitoring system accesses information regarding the automated process/sub-process from a plurality of data sources having different data types. The data sources can store unstructured or structured data including current data and historical data related to the automated sub-process and the KPIs used for monitoring the performance of the automated sub-process. The plurality of data sources can include input from the subject matter experts (SMEs), the usage data of the KPIs, the success rate of the KPIs used, the views/opinions/notes provided by other users and the like. The various inputs permit identifying KPIs that were successfully used in monitoring automation of one process in one industry to be applied to other processes within the same industry or even other industries. The plurality of data sources can include public and private data sources having the information in various formats such as flat files, relational database management system (RDBMS) files, noSQL databases, spreadsheets and the like. The process KPI qualifying and monitoring system can access the requisite information via views, stored procedures or direct access exposed by the plurality of data sources, implement the extract, transform and load (ETL) procedures and store the retrieved data into a local data store for further processing.

The KPIs identified from the extracted data are subject to approval from designated parties such as the SMEs and other parties involved in the automation process. The approved KPIs are provided to a user for selection and the user-selected KPIs are classified into at least two groups based on usability of the KPIs for monitoring the automation of the process. The classification includes training one or more ML-based classification models using training data which can include labeled historical data. Within the two groups, the KPIs can be further ranked using a ML-based ranking model. In addition, the data regarding the KPIs can be further analyzed for sentiments based on sentiment analysis. In an example, natural language processing (NLP) techniques including parsing, tokenization, lemmatization, entity and entity relationship extraction can be used to obtain data for the classification, ranking and sentiment analysis.

The KPIs are evaluated for usability in monitoring the impact of automation based on one or more of the classification, ranking and sentiment analysis. The evaluations can be provided as ratings, thumbs up/thumbs down etc. In addition to the evaluations, the monitoring system can provide questionnaires associated with the criteria used for selecting the KPIs. Dynamically controlled weights are added to the questions and the user's responses are collected. A fitment score is obtained for each KPI under each of the criteria used for the selection of the KPI. Based on the weights and the user responses, a subset of the classified and ranked KPIs can be shortlisted for the automated sub-process. Those KPIs that are not shortlisted are associated with different ratings based on the fitment scores. The ratings can be conveyed via various schemes such as but not limited, Red-Amber-Green (RAG) scheme. For those KPIs having Amber or Red rating, the user responses and comments provided in response to the questionnaire can be turned into recommended actions. When the recommended actions are implemented, the fitment score of the KPI can be improved for one or more of the corresponding criterion so that the KPI may improve the fitment score from the Amber or Red rating to Green rating thereby becoming usable for the automated sub-process. A report generator which generates reports regarding the various analytics associated with the processes, sub-processes and KPIs handled by the process monitoring system is also included therewith.

The AI-based process KPI qualifying and monitoring system disclosed herein provides the technical effect of employing AI techniques to not only extract data related to KPIs but also to identify the KPIs and user sentiments associated with the KPIs. Therefore, the process KPI qualifying and monitoring system is able to automatically select a subset of KPIs that are affected by or affect the automation of the sub-process. Moreover, the process KPIs tend to be dynamic and vary due to many factors that may affect the sub-process. The process KPI qualifying and monitoring system, via the data extraction methodologies disclosed herein can process the latest information associated with the KPIs as the data is retrieved from public and private data sources thereby mitigating the need for users to filter the data and select the KPIs.

FIG. 1 illustrates a block diagram of artificial-intelligence (AI) based process KPI qualifying and monitoring system 100 in accordance with examples described herein. The monitoring system 100 includes a data extractor 102, an approval processor 104, machine language engine (ML) 106, a configurator 108 and an Natural Language Processor. The monitoring system 100 is configured to access a plurality of data sources $110_1 \ldots 110_N$. In addition, the monitoring system 100 includes a local data store 112 for storing intermediate data as required. The monitoring system 100 can be configured as a set of machine executable instructions that are stored in a non-transitory storage medium which a processor can retrieve and execute to carry out the procedures detailed herein.

The data extractor 102 is configured to access various structured and unstructured data sources $110_1 \ldots 110_N$ for extracting the data regarding the KPIs 114. The KPI data 114 can include data related to the KPIs such as the listing of various KPIs for different processes that the monitoring system 100 is configured for and the information associated with the KPIs within the monitoring system 100. For each of the KPIs the information can include but is not limited to, the organization, the domain, process and sub-process, the user comments and responses regarding the KPIs, the entities and relationships between the entities, the fitment scores for the KPIs under each sub-process and the like.

The various data sources $110_1 \ldots 110_N$ can include public and private data sources such as, but not limited to, various types of databases, flat files, spreadsheets, comma separated values (CSVs) files, emails, web pages and the like. In an example, the data extractor 102 can include an unstructured data processor 152 that reads input from, for example, an email inbox employing natural language processing techniques. The input can be transferred the same to, for example, a shared file transfer protocol (SFTP) folder in the local data store 112. The data sources $110_1 \ldots 110_N$ include process inputs which can include, but are not limited to, particular KPIs and related information from source, subject matter experts (SMEs), KPI usage such as number of times the KPI was used in different processes/sub-processes, the success rate of the KPI, feedback related to the KPI usage and other information including KPI dependency, similar use-cases, KPI usage in different domains and/or organizations and the like.

The data extractor 102 initially receives, from a user via an input graphical user interface (GUI) 140, information regarding an automated process including but not limited a unique ID, description, an operating group or industry etc. Based on the information received from the input GUI 140, information related to the automated process, such as but not limited to, the pertinent domain, process and sub-processes related to the automated process can be retrieved from the local data store 112. Additionally, each of the sub-processes have a set of KPIs associated therewith within the monitoring system 100. The KPIs can include standard KPIs that are associated by default with the sub-process and custom KPIs that the user may uniquely define for the sub-process. In fact, the input GUI 140 provides a mechanism by which the user may add new KPIs to monitor the impact of automating the sub-process.

In an example, the data extractor 102 also includes a screen scrapper 154 to extract data from the data sources 110.sub.1 . . . 110.sub.N. The screen scrapper 154 can read data regarding the KPIs from configured web sites using web data extraction or screen scraping techniques that leverage "pattern based data", "table data" and "regular data". In an example, MICROSOFT SQL Server Integration Services (SSIS) can be used to extract, validate and transform the data from the data sources 110.sub.1 . . . 110.sub.N and load it into the local data store 112. The example data extractor 102 can implement modules corresponding to control flow, data flow and event handlers. The data flow can be built using the source component which includes technologies such as but not limited to Open Database Connectivity (ODBC), ActiveX Data Objects (ADO.NET), Object Linking and Embedding Database (OLEDB), EXCEL and the like.

The unstructured data processor 152 can also be employed to process the unstructured data from the websites or other data sources to obtain the information regarding the KPIs. At least a subset of the KPIs associated with the automated process and the sub-process can be dynamic KPIs whose values are updated or changed with passage of time. The data extractor 102 therefore includes a scheduler 156 that implements an automatic service based on configured intervals. The scheduler 156 can execute the instructions to read the latest data related to the KPIs from one or more of the data sources $1101$ . . . $110_N$ and push the data into the local data store 112 as discussed herein.

The monitoring system 100 includes an approval processor 104 that periodically reads the local data store 112 for the updates regarding the KPI data 152 and initiates an approval process to present the KPIs for user selection. The approval processor 104 can send an automatic email to the responsible parties entered within the monitoring system 100 for approval or validation of the KPIs that were updated during the last refresh. Similarly, information regarding new KPIs can also be provided to the related parties for approval prior to being presented for user selection. The responsible parties can either approve the KPIs or reject the KPIs for user presentation. When the KPIs are rejected, the party rejecting the KPI can provide comments concerning the rejection. The rejected KPIs are suppressed from being presented to the user while the party's comments are captured for further analysis. The approved KPIs are moved to a master KPI table 162 stored, for example, on the local data store 112 for presentation to the users.

The KPI processor 106 includes various mechanisms for classifying the KPIs, ranking the KPIs and recommending particular KPIs from the various KPIs that were approved for presentation to users for each of the processes and sub-processes. In particular, the KPI processor 106 can employ natural language processing (NLP) techniques for processing the data regarding the approved KPIs stored to the local data store 112 to execute the tasks associated with identifying KPIs that are particularly relevant to a given sub-process identified by a user via the input GUI 140. The details regarding the various tasks carried out by the KPI processor 106 will be detailed further herein. The top-ranked KPIs from the classified and ranked KPIs are recommended to the user based on the user selections from the approved KPIs. Thus, each KPI selected by the user is indicated as usable or unusable for determining the impact of automation of the process via a thumbs up or a thumbs down icon.

The configurator 108 accesses the KPIs evaluated by the KPI processor 108 to receive further user feedback and arrive at a fitment score for each of the KPIs. The user feedback, in one example, is received as responses to a set of questions. The questions can be related to criteria that are applied to selecting the KPIs for a given process. The questions are therefore be related to determining compliance of the KPI to particular criteria for a given sub-process. The questions enable the monitoring system 100 to pick KPIs that are directly impacted by the automation, KPIs which are quantifiable, KPIs with a baseline that can be referenced, KPIs with reliable data sources and with pre-agreed definitions and that all the stake holders impacted by the KPIs are aligned. In addition, the user can include comments regarding the KPIs which can be converted to recommended actions in instances where appropriate. Based on the responses to the questions, a fitment score 146 can be calculated for each KPI 144. The fitment score 146 determines whether or not the KPI 144 can be used to determine the impact of automation on the process. The indication regarding the usability or un-usability of the KPI for the sub-process is conveyed to the user via the output GUI 142.

The various elements of the monitoring system 100 employ natural language processing (NLP) techniques facilitated by the Natural Language Processor 120 to analyze the data regarding the KPIs 114 that was collected from the various data sources and execute the various functions. For example, the KPI processor 106 can employ the NLP techniques for the classification, ranking and to determine the sentiment associated with the various KPIs obtained from the different data sources $110_1$ . . . $110_N$. The Natural Language Processor 120 can also assist the configurator in assigning final weights and the fitment scores to the KPIs. The Natural Language Processor 120 includes a parser 122 that parses text or unstructured data extracted from one or more of the data sources $110_1$ . . . $110_N$ and a tokenizer 124 that generates tokens from the parsed data. A lemmatizer 126 accesses the tokens for one or more of stemming and lemmatization which includes morphological analysis of various forms of words, removal of inflectional endings. A POS tagger 128 identifies the parts of speech from the various tokens and tags the tokens with the parts of speech. The various elements of the NLP enable the entity and relationship extractor 130 to identify entities and derive the relationships between the entities. The information thus derived from the data sources $110_1$ . . . $110_N$ can be stored in the data store 112 for access by the various elements of the monitoring system 100.

In an example, the monitoring system 100 can also include a report generator that generates various reports related to the KPI data that has been analyzed by the monitoring system 100.

Figure 2:
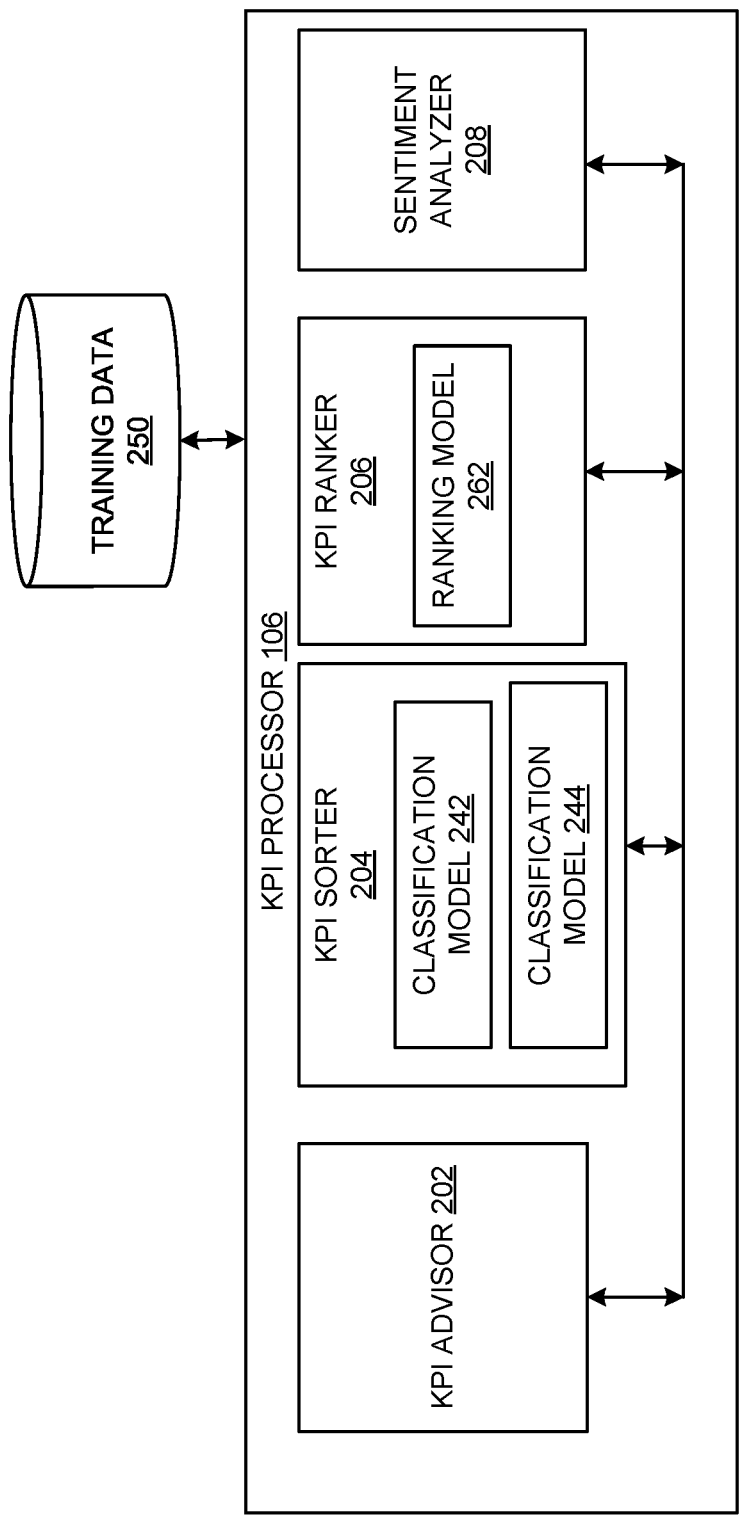
FIG. 2 illustrates a block diagram of a KPI processor in accordance with examples disclosed herein.

FIG. 2 illustrates a block diagram of the KPI processor 106 in accordance with examples disclosed herein. The machine learning engine 106 receives the data regarding the KPIs that were approved for presentation to the user, processes the data to classify, rank and provide confidence levels for the standard KPIs among the KPIs approved for presentation to the user using AI methodologies such as but not limited to NLP techniques and ML models. The KPI Advisor 202 initially accesses the KPIs that were approved for presentation to the user from the approval processor 104 and presents the approved KPIs to the user for selection. At this point, the user is provided with approved KPIs including standard and custom KPIs that are associated within the monitoring system 100 for the organization, domain, process and sub-process specified by the user via the input GUI 140. The user makes further selections of the KPIs from the approved KPIs. In addition, the user can also define custom KPIs to be used in the process automation evaluation via the initial selector 222.

The information regarding the user-selected KPIs, including the standard, custom and/or newly defined KPIs is communicated to the KPI sorter 204 by the KPI advisor 202.

The KPI sorter 204 can include at least two KPI classification models 242, 244 which employ a supervised learning approach in which the KPI classification models 242, 244 learn from training data 250. In some examples, the training data 250 can be stored in different data sources. For example, the training data 250 can be stored on one or more of the data sources $110_1 \ldots 110_N$ or the local data store 112. The training data 250 can include labeled historical data related to KPIs that were found usable and un-usable for the particular combination and sub-combination of organization, domain, process and sub-process. The models 242 and 244 are evaluated and one of the best scoring models 242 and 244 is selected to classify each of the KPIs into one of a usable KPI or an unusable KPI. In an example, the classification models 242, 244 can implement Two-Class algorithms for the classification of the KPIs. Two-Class Boosted Decision Tree, Decision Forest, Decision Jungle, Logistic Regression and Support Vector Machines (SVMs) are some non-limiting examples of ML models that can be used for the classification models 142 and 144. The classified KPIs are then ranked within their particular class (e.g., usable class or un-usable class) based on ascending or descending order of usability. A KPI ranker 206 including a ranking model 262 can be used for ranking the usable and un-usable KPIs. The KPI ranker 206 can recommend the ranking using one of Instance Ranking and Label Ranking. In an example, the ranking model 262 can implement one of a Bipartite ranking, K-partite ranking and General Instance ranking. The KPI processor 106 also includes a sentiment analyzer 208 the employs various techniques including those provided by the Natural Language Processor 120 to determine the sentiment associated with the user feedback. For example, MICROSOFT Cognitive Services—Text Analytics Application Programming Interface (API) can be used to identify the sentiment in the user feedback. Each of the inputs from the KPI advisor 202, the KPI sorter 204, KPI ranker 206 and the sentiment analyzer 208 is received by the configurator 108 to determine the recommendations associated with the KPIs as detailed further infra.

Figure 3:
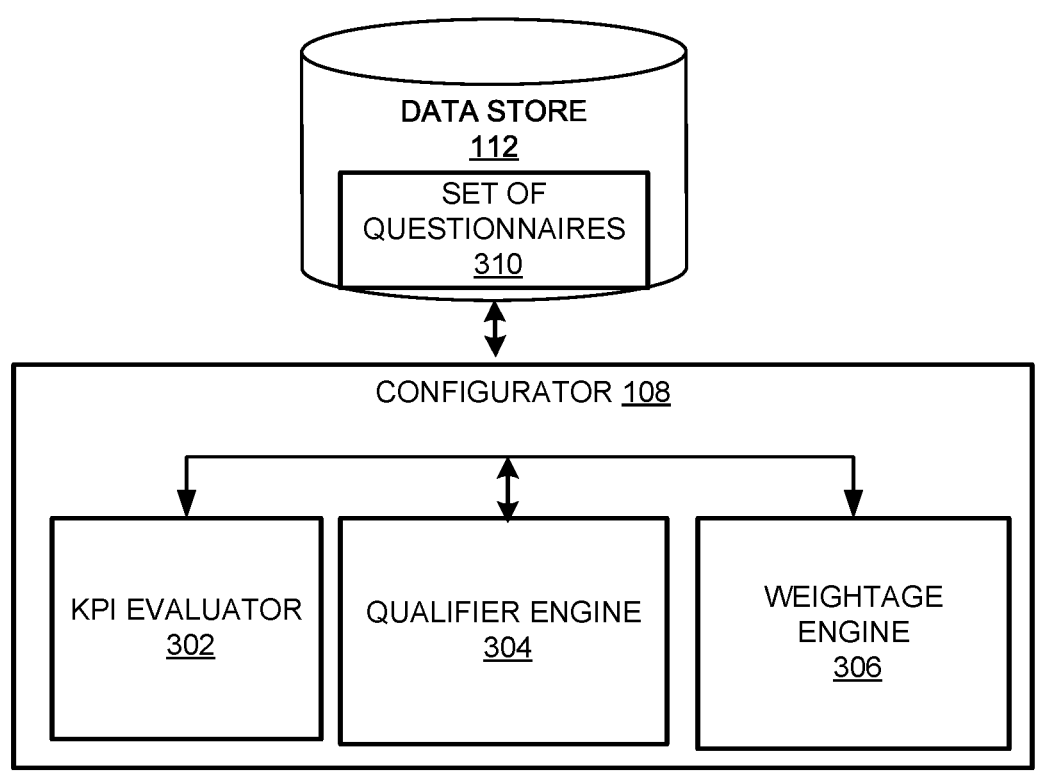
FIG. 3 shows a block diagram of a configurator in accordance examples disclosed herein.

FIG. 3 shows a block diagram of the configurator 108 in accordance examples disclosed herein. A KPI evaluator 302 accesses inputs from the various elements of the KPI processor 106 including the KPI sorter 204, the KPI ranker 206 and the sentiment analyzer 208 to evaluate 148 the various KPIs selected by the user. Based at least on the past usage data, the recommender 302 can provide evaluations or make predictions regarding whether the user-selected KPIs would work or may not be suitable for monitoring the automation of the sub-process 148. The information extracted from the pattern or previously used data can be molded into the prediction of relevant data for the user.

The evaluations or confidence levels for each of the user-selected KPIs can be conveyed in terms of yes/no such as a thumbs up or thumbs down symbols. The KPI evaluator 302 can implement a ML model that is trained on past data and via prior usage analytics of each of the KPIs. In an example, MICROSOFT AZURE Machine Learning Studio can be used for training the recommender 302 which can implement a Matchbox Recommender. The implementation can be performed using content based filtering, collaborative filtering and hybrid content-collaborative based filtering.

The configurator 108 further includes a qualifier engine 304 which produces a set of questionnaires 310. Each questionnaire in the set of questionnaires 310 corresponds to one of the KPIs and pertains to, for example, five criteria that are used to determine the suitability of the KPI to monitor the automation of the sub-process. The five criteria include direct impact of the KPIs, whether the KPI is quantifiable, baselined, reliable and aligned. In an example, the questions can be multiple choice in nature wherein the user is required to select one of the options that is the best option for that KPI. In an example, the questions can include Yes/No questions. The qualifier engine 304 also enables the user to add comments against the questions in the comments box included in the GUI providing the questions. The comments, in an example, are automatically converted into recommended actions using analytics and the Natural Language Processor 120.

The user-selected KPIs are then accessed by a weightage engine 306 that assigns weights based on the questions associated with the KPIs. Each question for each KPI can have a weightage defined which is dynamically controlled based on the user response. Accordingly, for each question, each of the user responses also carry a predefined weightage or a score. The weightage of the questions included in a questionnaire in combination of the answer scores associated with the KPI is employed to arrive at a fitment score for that KPI. Each of the five criteria can have pre-configured thresholds which are indicative of whether the KPI is usable, whether the KPI is currently not usable but has potential to be used with some changes or whether the KPI should be discarded as completely un-usable. Based on the comparisons of the fitment scores with the corresponding thresholds, the KPIs are recommended for usage in evaluating the automation of the sub-process. The KPIs, with their fitment scores and their usability statuses are displayed to the user via the output GUI 142. For some KPIs which are determined to be un-usable, the user may indicate that certain recommended actions will be implemented which can change the status of the KPI from being discarded as un-usable to having potential for being used.

Figure 4:
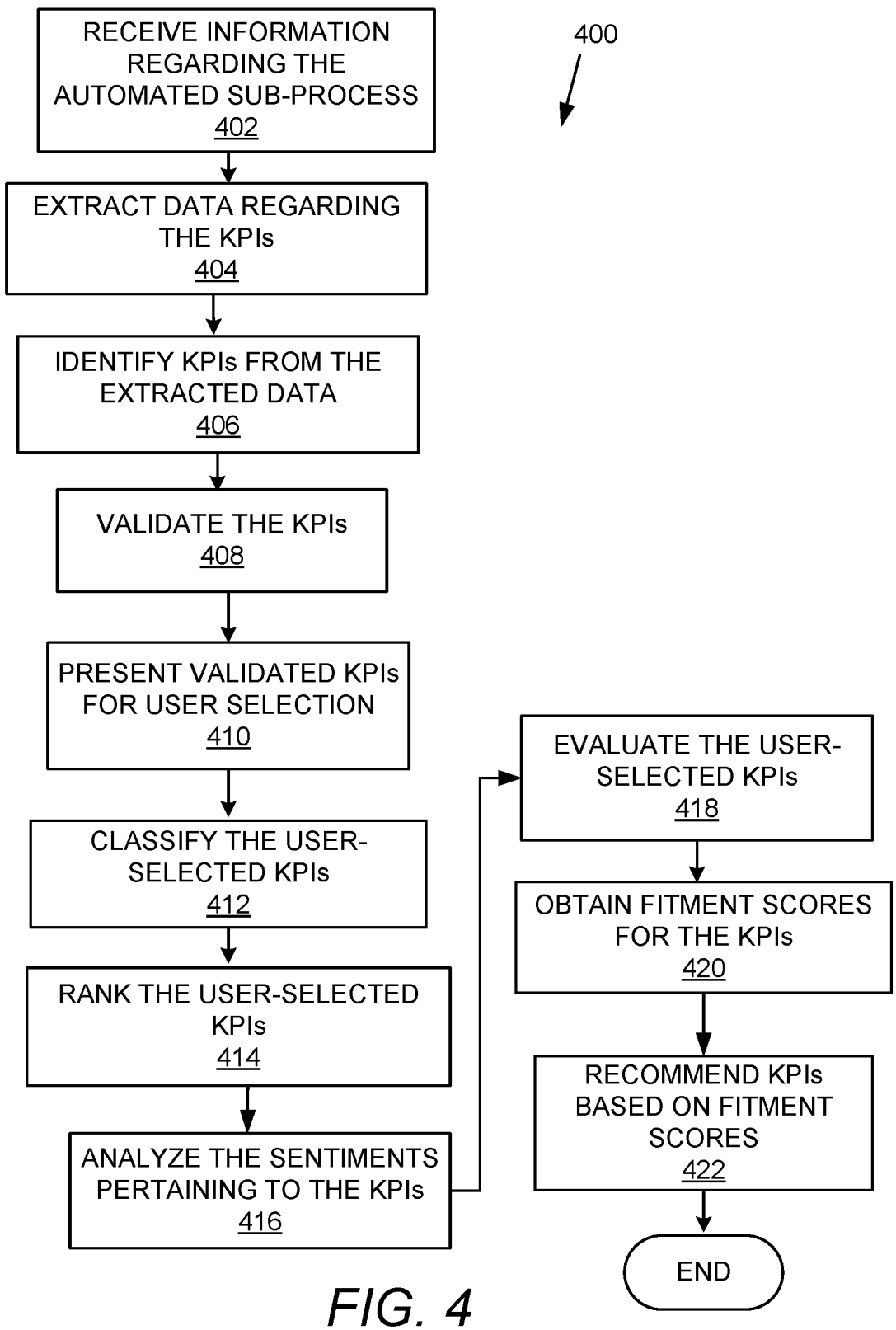
FIG. 4 shows a flowchart that details a method of identifying KPIs for monitoring the automation of a sub-process in accordance with examples disclosed herein.

FIG. 4 shows a flowchart 400 that details a method of identifying KPIs for monitoring the automation of a sub-process in accordance with examples disclosed herein. The method begins at 402 wherein the information regarding the automated sub-process 148 is received. The information can include one or more of the organization, industry, operating group, description, geography, the sub-process id 148 and the like. In an example, the monitoring system 100 can provide an input template e.g., a spreadsheet for the user to enter the details at 402. The information received at 402 is used to extract the data regarding the KPIs 114 from the plurality of data sources $110_1 \ldots 110_N$ at 404. The data regarding the KPIs can pertain to identities of particular KPIs to be used, the past usage history of the KPIs including the processes/sub-process in which the KPIs were used, the successes and failures of the KPIs to monitor those processes/sub-processes, feedback from other users of the KPIs which may include reasons for the successes of failures, recommended actions, input from SMEs of those particular processes/sub-processes and the like. The data regarding the KPIs thus extracted can be stored in the local data store 112 for use by the monitoring system 112.

At 406, the KPIs are identified from the data gathered at 404 by the data extractor 102 using, for example, the Natural Language Processor 120. The KPIs thus identified are put through an approval process for validation at 408 wherein approvers such as SMEs for the particular sub-process and other stake holders approve or disapprove the usage of the KPIs for the sub-process via automatically received email. The validated KPIs are then further presented to the user for selection at 410. The user-selected KPIs are further classified at 412 into one of a subset of usable KPIs or a subset un-usable KPIs. One of the classification models 242 or 244 can be evaluated and selected for the classification of the KPIs at 412. The classified KPIs are ranked at 414 using the ranking model 262, for example, in a descending order of usability. Therefore the usable KPIs are ranked above the un-usable KPIs. Within each of the usable and un-usable KPI groups, the KPIs can be further ranked in a descending order of usability so that the most usable KPI is ranked first and the least usable KPI is ranked last in the overall rankings. The data pertaining to the user-selected KPIs can be further analyzed for sentiments associated with each of the KPIs at 416. In an example, the sentiment data associated with a user-selected KPI can be aggregated and the overall sentiment associated with using the KPI for the sub-process 148 can be obtained at 416.

The classification, ranking and sentiment data is used at 418 to produce evaluations of the user-selected KPIs that are conveyed to the user. Fitment scores are further obtained at 420 for the KPIs thus evaluated. Based on the fitment scores, one or more of the evaluated KPIs can be recommended for use in monitoring the automation of the sub-process at 422. The recommendations can be determined based on a comparison of the fitment scores with the corresponding thresholds. Similarly, KPIs for other sub-processes associated with a process can be determined and the mathematical values associated with the KPIs can be combined or aggregated to determine impact of automating the process. In an example, the procedure outlined in FIG. 4, can be repeated at periodic intervals to update the data regarding the KPIs 114 in the local data store 112, to obtain new KPIs that may be identified for processes/sub-processes being analyzed by the process monitoring system 100, to obtain the latest user sentiments regarding the KPIs and the like.

Figure 5:
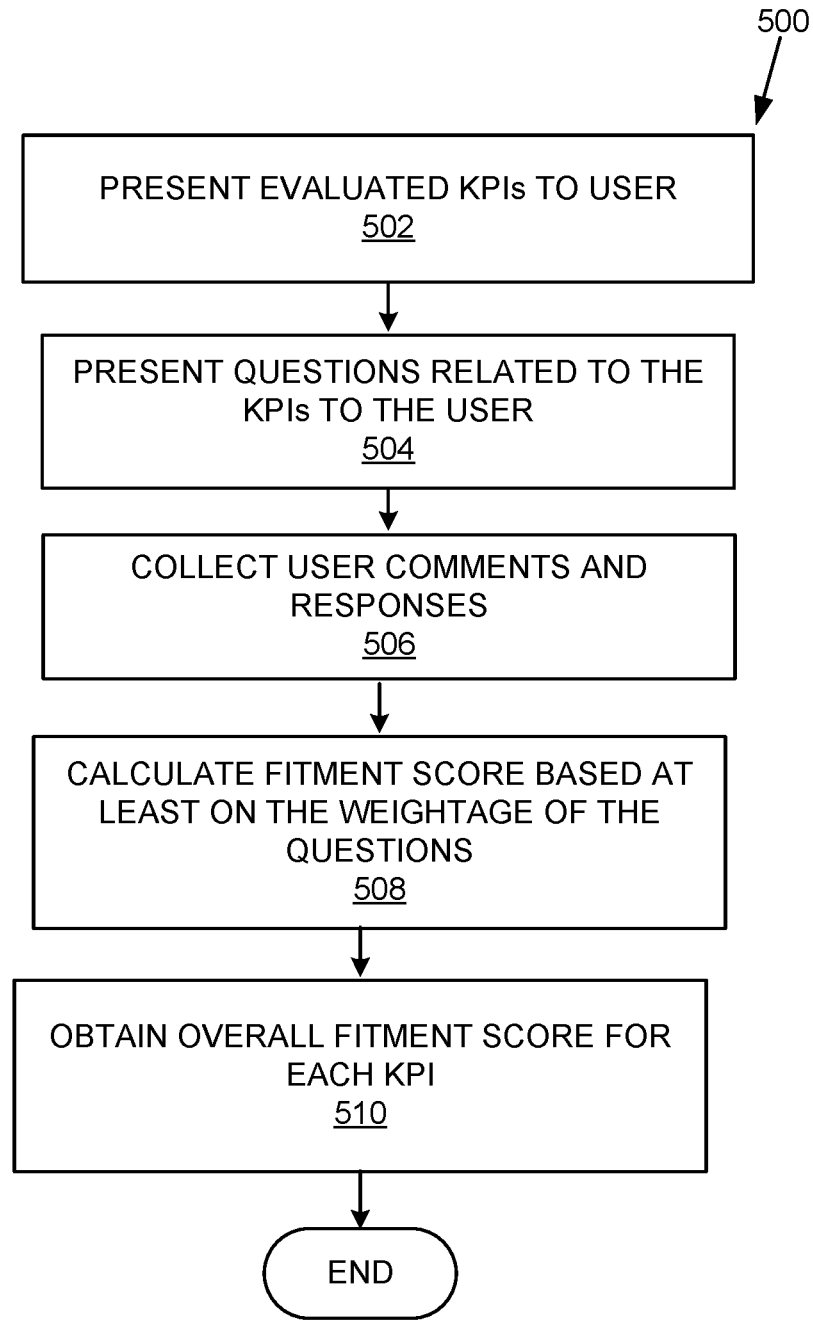
FIG. 5 shows a flowchart that details a method of obtaining fitment scores in accordance with examples disclosed herein.

FIG. 5 shows a flowchart 500 that details a method of obtaining fitment scores in accordance with examples disclosed herein. The KPIs that were evaluated based on the classification, ranking and user sentiment are presented to the user with their corresponding evaluations at 502. In addition, questions related to the plurality of KPI selection criteria associated the automated sub-process are presented to the user at 504. Each of the questions has a dynamically controlled weightage attached to it. The GUI presenting the questions also allows users to enter comments related to the KPIs. Accordingly, the user responses and comments are collected at 506. Each of the user responses and comments can also carry a predefined weightage or score assigned to it. The user responses can be scored, for example, based on accuracy. The user's answers can be compared with answers obtained from one or more of the data sources $110_1 \ldots 110_N$ to the same question in order to derive the score. If the user's answer is similar to the other answers, the user's answer can receive a high score else it may receive a lower score. If no answers can be retrieved for a given question from at least one of the data sources $110_1 \ldots 110_N$, then the user's response can receive maximum score to begin with and may be adjusted as response data is gathered for that question through its continued usage. Based on the scores of the user responses, comments and the weightage attached to the questions, the fitment score is calculated at 508 for each KPI under each of the KPIs based on the individual fitment scores of the KPIs under each of the KPI selection each of the plurality of KPI selection criteria. An overall fitment score is obtained at 510 for criteria. The fitment score for each of the KPIs can be obtained via, for example, aggregating the question weightages and answer scores for each of the selection criteria for that KPI.

The user responses to the questions can be used to generate recommended actions for particular KPIs with fitment scores below the corresponding thresholds. The actions, when implemented, serve to improve the fitment scores above the thresholds thereby enabling usage of the KPIs for monitoring the automated process. The actions can include one or more of the core actions, recommended actions and custom actions. The core actions are those which are associated by default with the KPIs by the process monitoring system 100. Custom actions are those which can be input by the user via the input GUIs described herein that are put forth by the process monitoring system 100. By the way of illustration the monitoring engine as described herein can aid the user in sifting through tens or hundreds of potential KPIs to select KPIs for monitoring the automation of a process.

Figure 6:
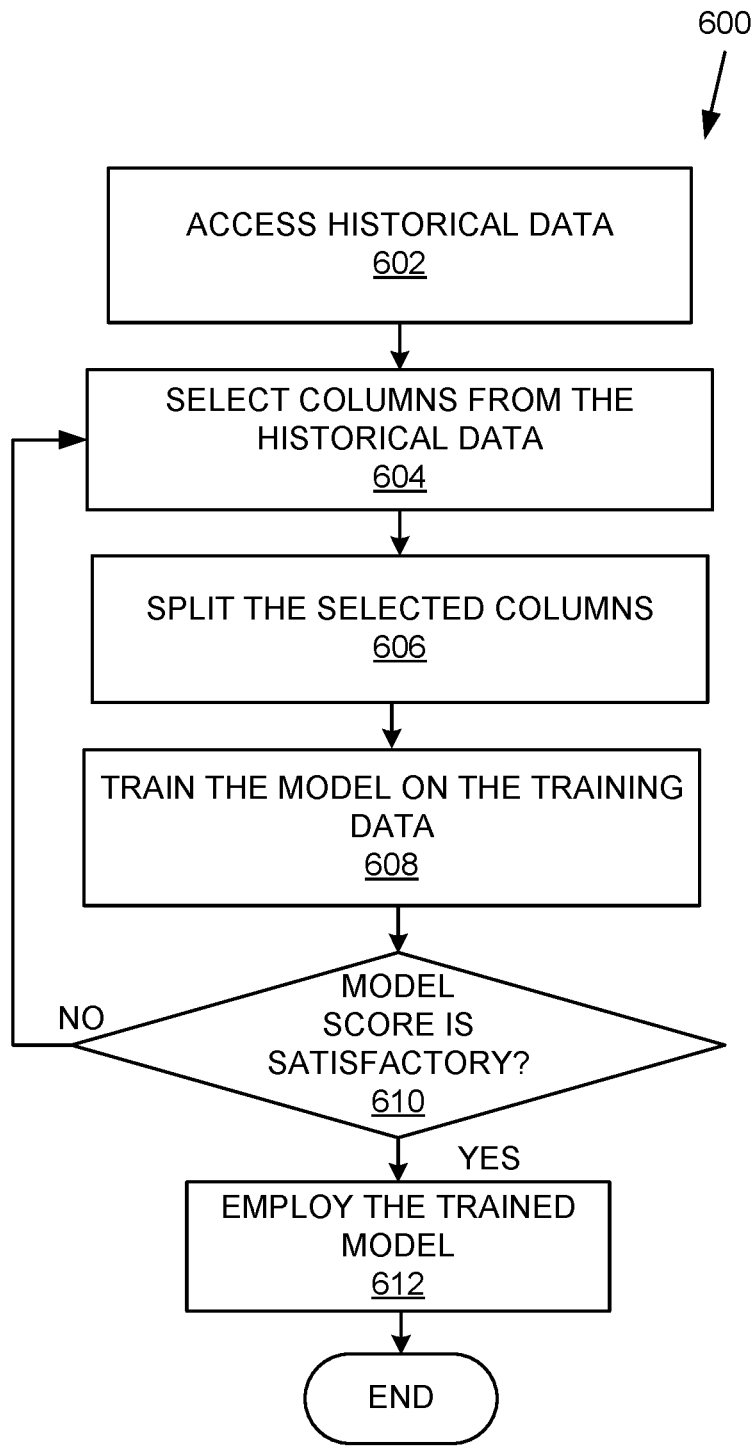
FIG. 6 is a flowchart that details a method of training the various models in accordance with examples disclosed herein.

FIG. 6 is a flowchart that details a method of training the various models used for the classification, ranking and recommendation in accordance with examples disclosed herein. The method begins at 602 wherein the historical data is accessed. The historical data can include KPI master data which stores historical information extracted from the various data sources $110_1 \ldots 110_N$ and the data produced by the various elements of the monitoring system 100 including the KPI processor 106, the configurator 108 and the like. In some instances, such as, when training a model for the recommendations, the training data can also include KPI user map data etc. The particular columns for training the model are selected at 604. The selected columns are split at 606 into at least two sets, the training data set and the testing data set. In an example, the training data 250 can include labeled data which enables supervised learning. The training data is employed at 608 to train the model. The model can include one of the selected classification models 242, 244 or the ranking model 262 or a model employed for the evaluations of the KPIs. The accuracy of the trained model is evaluated or scored with the testing dataset at 610. If the model scores satisfactorily, it is employed at 612 for executing the function that the model was trained for. Else, the method returns to 604 wherein more columns are selected for training the model.

Below are described various input and output GUIs that are put forth by the monitoring system 100 for receiving and conveying information regarding the KPIs in accordance with examples disclosed herein. The below GUIs are discussed in the context of a use case scenario. It can be appreciated that the GUIs and the use case are discussed herein for illustration purposes only and that other use cases and GUIs may also be employed in accordance with examples disclosed herein.

Figure 7:
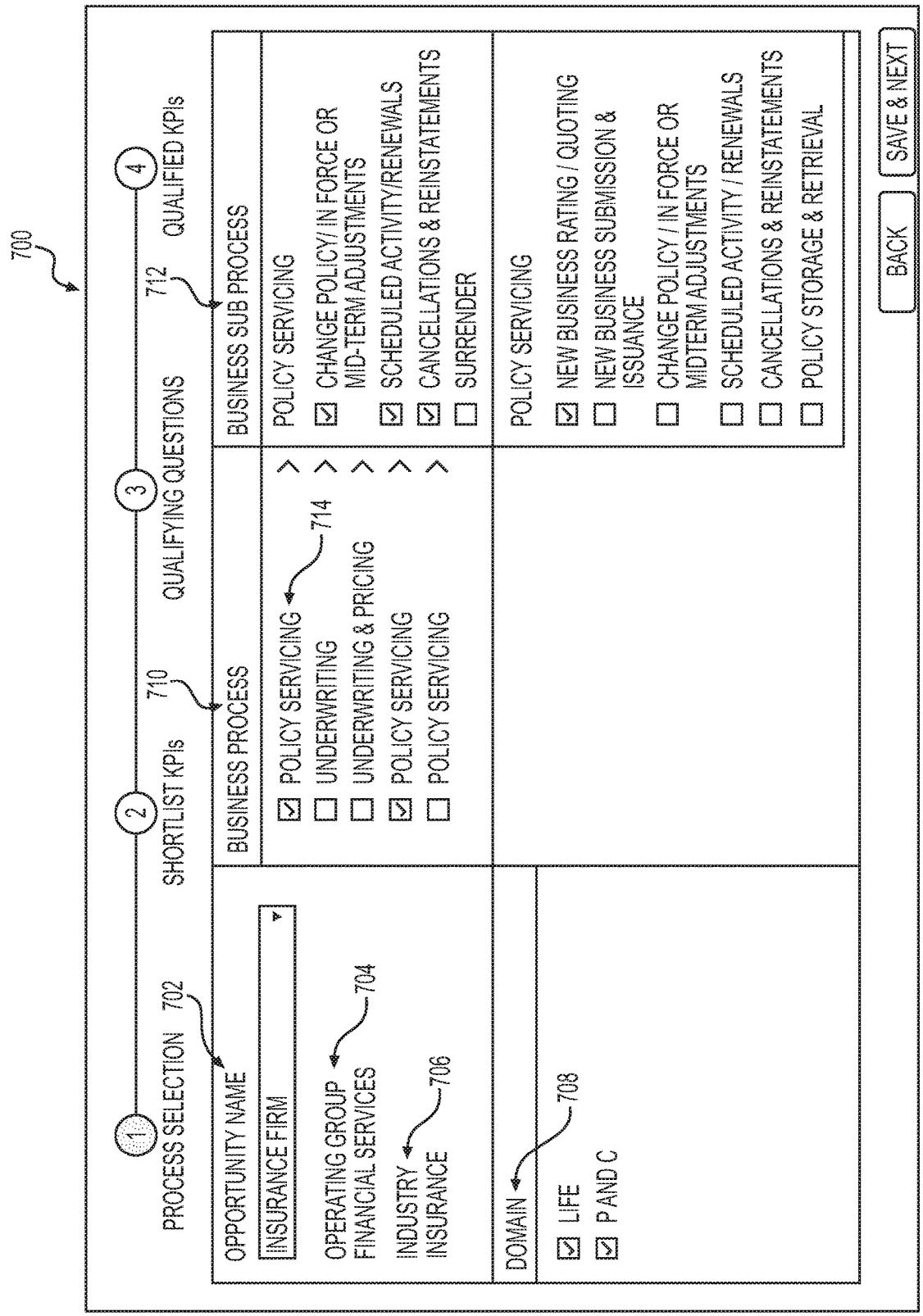
FIG. 7 illustrates a process selection screen in accordance with the examples disclosed herein.

The illustrated use case pertains to an automating process related to policy servicing in the financial services operating group in the insurance industry. FIG. 7 illustrates a process selection screen 700 in accordance with the examples disclosed herein. The information regarding one or more of the opportunity name 702, the operating group 704, the industry 706, the process 710 etc. can be supplied by the user via the input GUI 140. While the information regarding the domains 708, sub-processes 712, etc. can be retrieved by the monitoring system 100 based on the information entered by the user. For example, the sub-process 148 can pertain to one of the sub-processes 712. The retrieved information along with the information entered by the user is displayed via the process selection screen 700. A policy servicing process 714 is selected by the user for analysis by the monitoring system 100. The process monitoring system 100 retrieves the sub-processes under the policy which are presented for user selection. The user selects sub-processes of 'change policy', 'scheduled activity/renewals', 'cancellations & reinstatements' and 'new business rating/quoting' for further KPI analysis as indicated by the check boxes. The KPIs associated with the user selected sub-processes are analyzed by the monitoring system 100 to provide recommendations.

Figure 8:
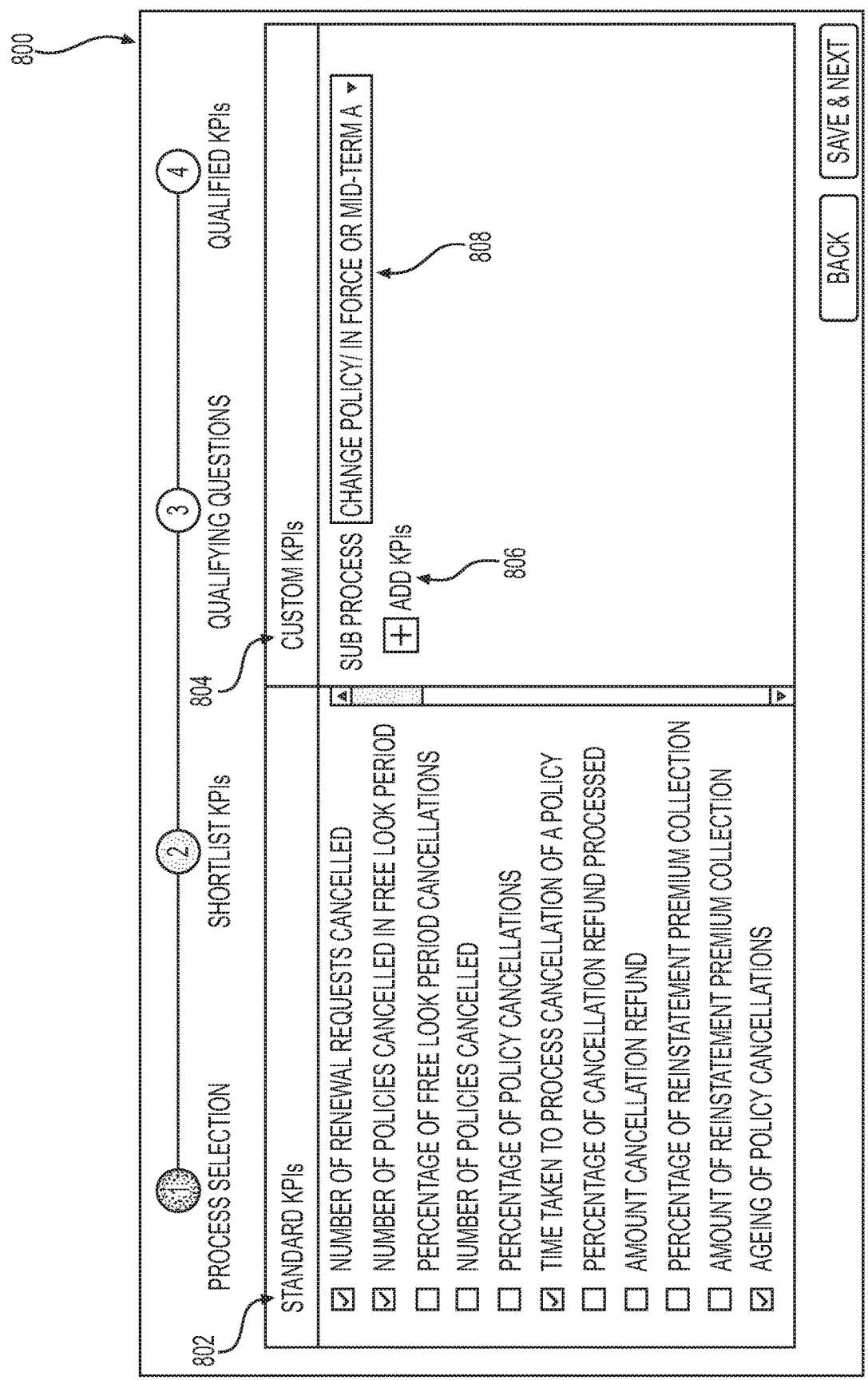
FIG. 8 illustrates a KPI selection GUI that displays the KPIs associated with one of the selected sub-processes in accordance with examples disclosed herein.

FIG. 8 illustrates a shortlisted KPI GUI 800 that displays the KPIs shortlisted for one of the selected sub-processes in accordance with examples. The KPIs displayed to the user include standard KPIs 802 and the custom KPIs 804. The custom KPI section of the GUI 800 includes a new KPI mechanism 806 using which, users can add further custom KPIs for a selected sub-process 808. The newly added custom KPIs can be updated to the KPI master data table on the local data store 112 upon approval. In an example, the scheduler 156 can begin extracting data regarding the newly added KPIs from the plurality of data sources $110_1 \ldots 110_N$ along with the data of other KPIs at scheduled times.

As indicated by the check boxes, the user selected KPIs include 'number of renewal requests cancelled', 'number of policies cancelled in free look period', 'time taken to process cancellation of a policy' and 'ageing of policy cancellations'. The data related to the KPIs including the success of the KPIs to monitor the automation of the selected sub-process in view of the criteria defined herein can be recorded and used for training the various ML models used by the monitoring system 100. In an example, the custom KPIs defined by the user by employing the new KPI mechanism 806 can be put through the approval processor 104 for approval by the responsible parties prior to being employed to monitor the selected sub-process. In an example, KPIs particular to an organization can also be added based on NLP analysis of particular documents.

Figure 9:
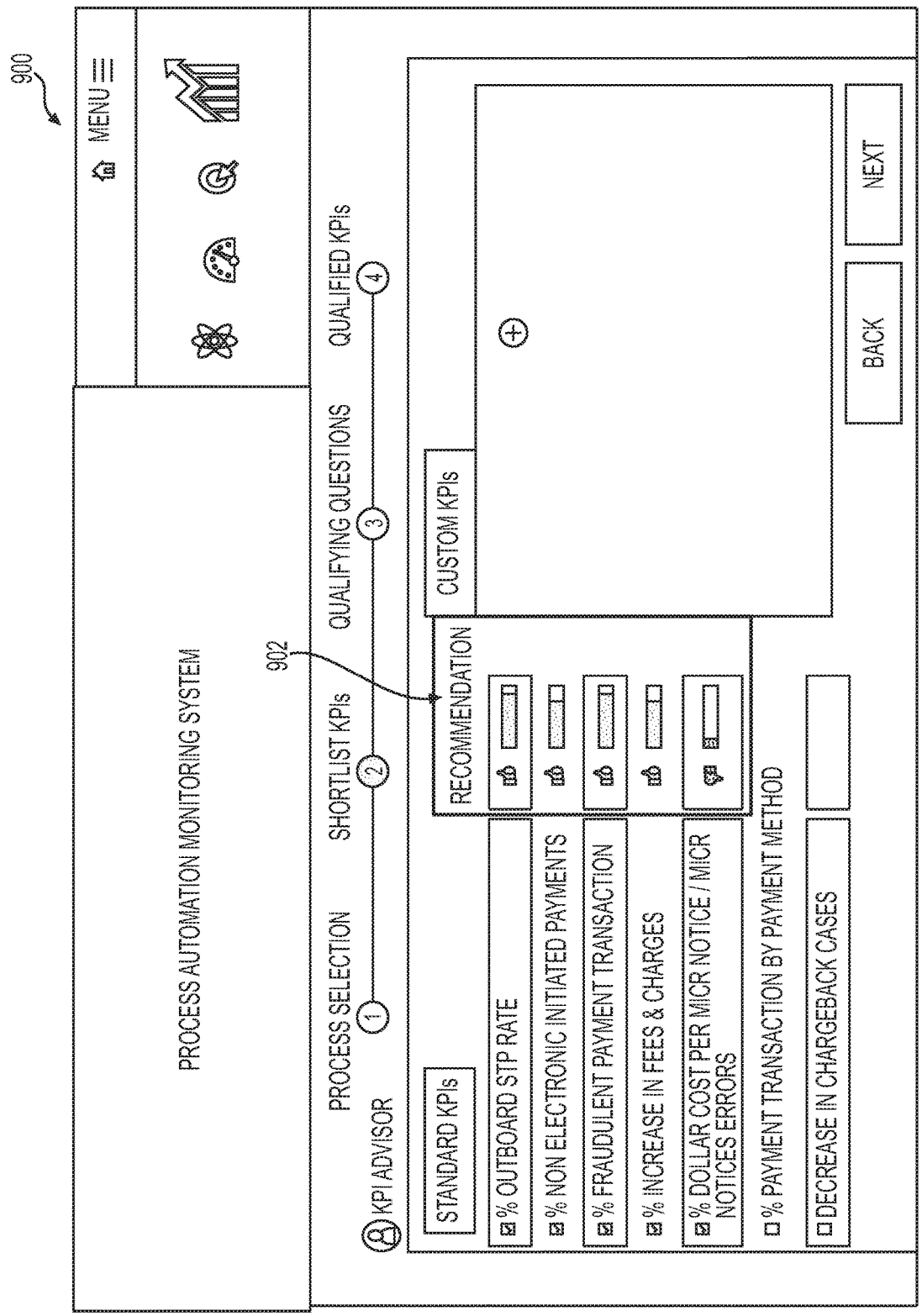
FIG. 9 shows an evaluator screen wherein evaluations regarding the KPIs are displayed in accordance with examples disclosed herein.

FIG. 9 shows an evaluator screen 900 wherein the monitoring system 100 provides evaluations regarding the standard and custom shortlisted KPIs in accordance with examples disclosed herein. The confidence evaluations 902 are generated based on the classification, ranking and the sentiment analysis carried out by the KPI processor 106 on each of the shortlisted KPIs. The scores for each KPI from the various ML models can be fed to the KPI evaluator 302 which generates the evaluations or recommendations 902 in terms Yes/No or thumbs up/thumbs down or other similar scheme as shown herein.

Figure 10:
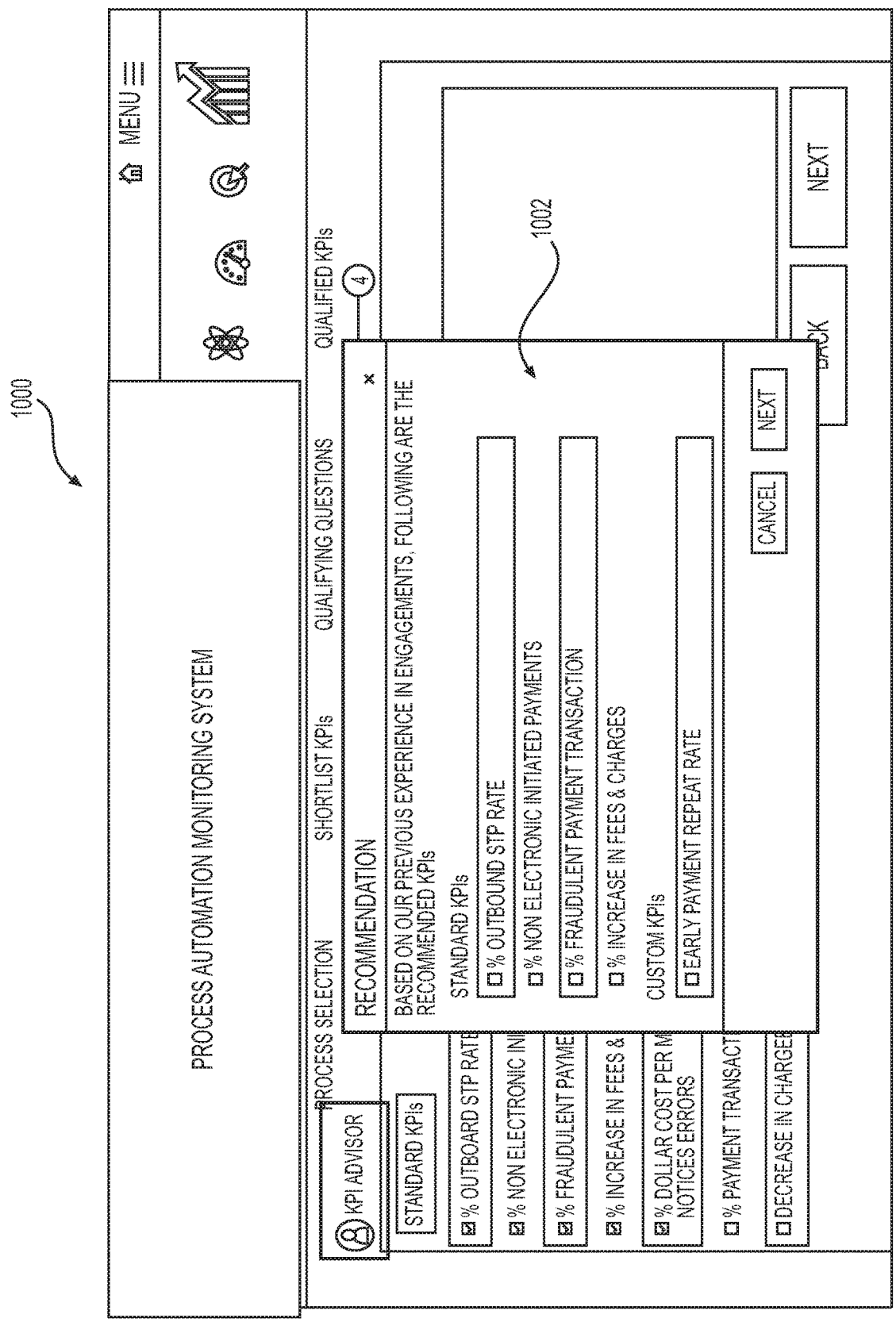
FIG. 10 shows a recommendation screen which includes recommended KPIs in accordance with examples disclosed herein.

FIG. 10 shows a recommendation screen 1000 which includes the shortlisted KPIs 1002 that can be used for evaluating the automation of the selected sub-process. When compared with FIG. 9, it is noted that those KPIs with thumbs up confidence level are recommended while those with thumbs down confidence level are discarded or suppressed.

Figure 11:
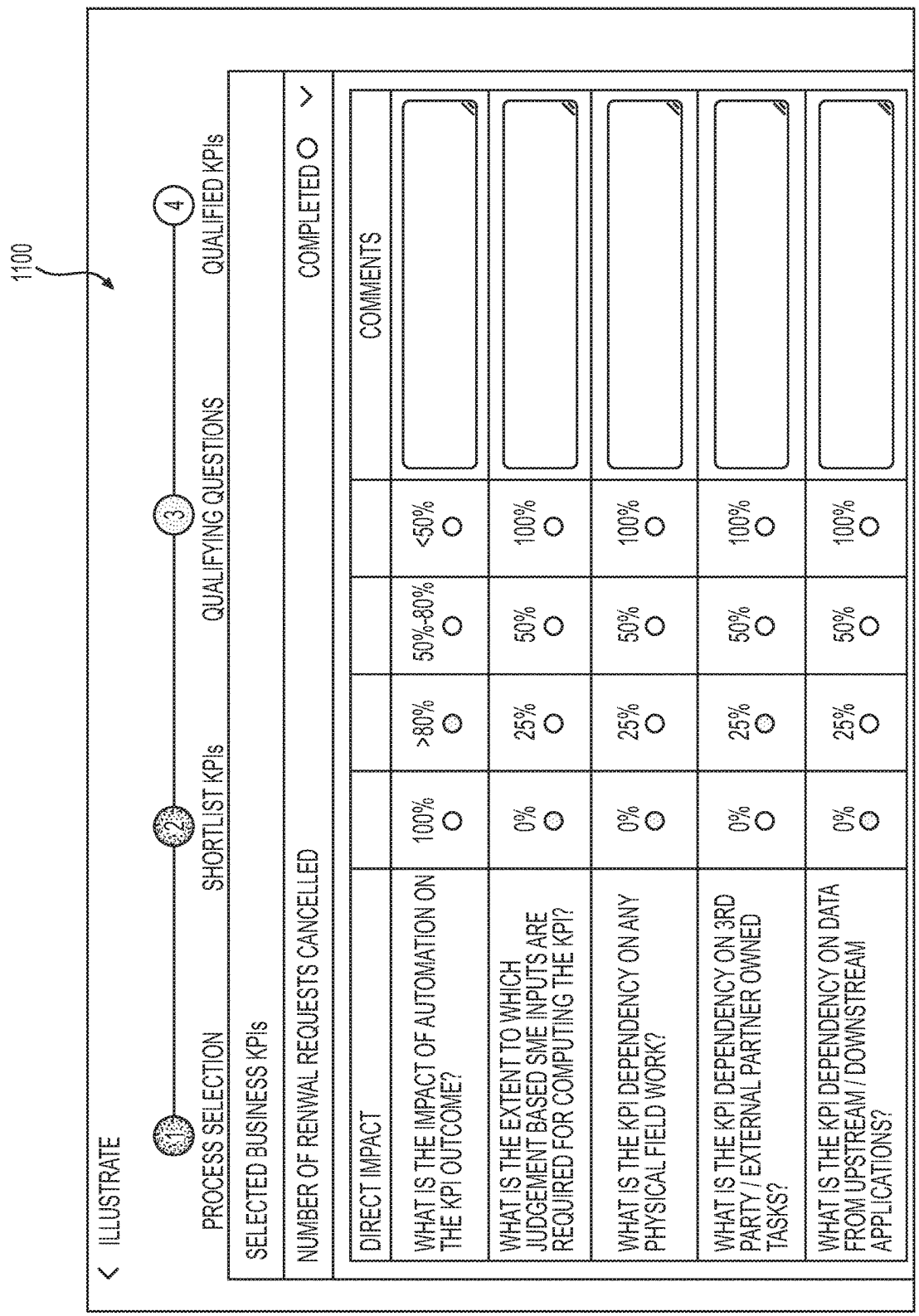
FIG. 11 shows a questionnaire generated by the monitoring system in accordance with examples disclosed herein.

FIG. 11 shows a questionnaire 1100 generated by the monitoring system 100 in accordance with some examples. As discussed herein, user input regarding the suitability of each of the evaluated KPIs 1002 of the selected sub-process is collected in the form of questionnaires. The questionnaire 1100 includes qualifier questions related to the criteria used for determining usability of the KPIs for the sub-process.

Figure 12:
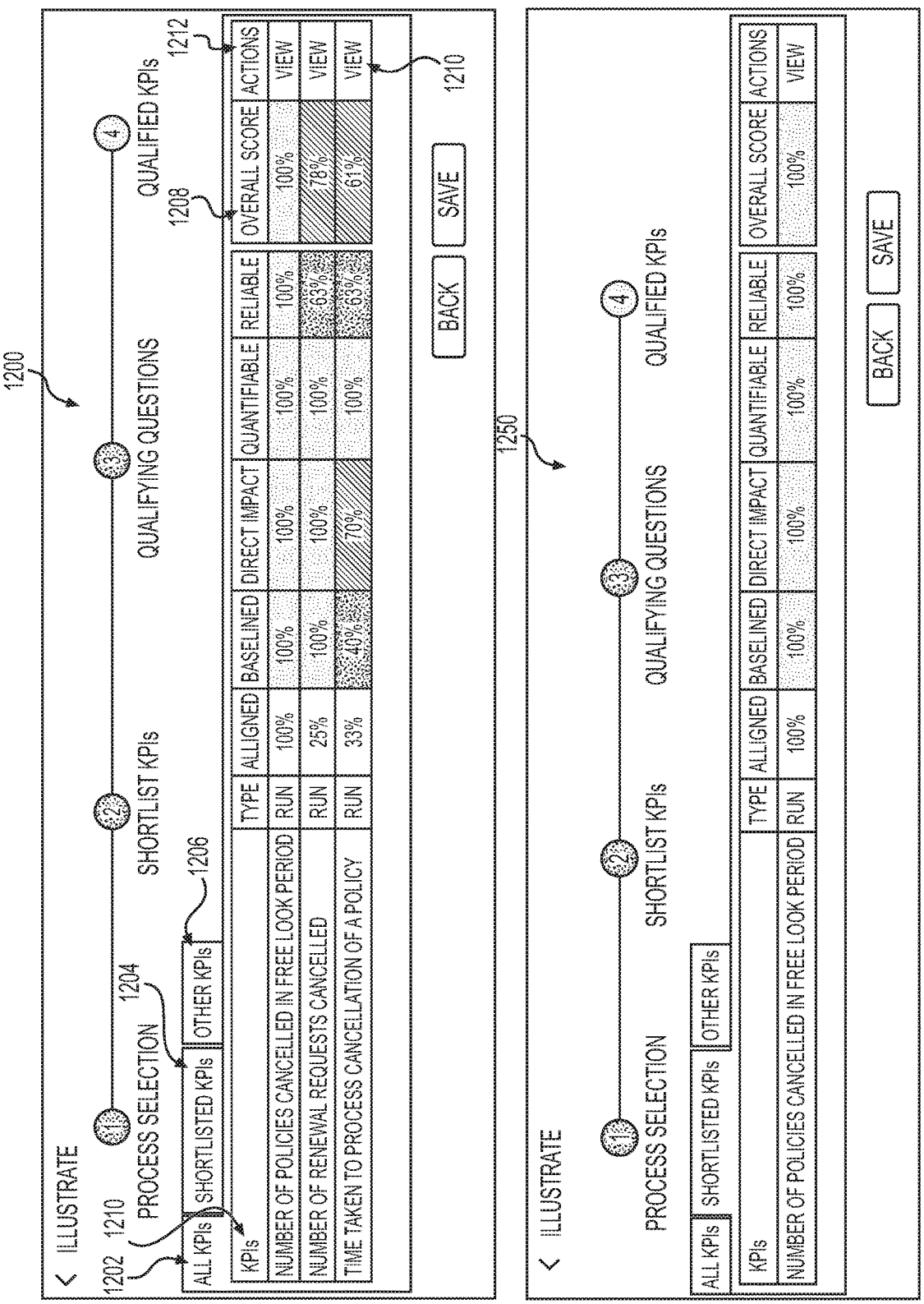
FIG. 12 shows a fitment score screen that displays the various recommended KPIs based on their respective fitment scores in accordance with examples disclosed herein.

FIG. 12 shows a fitment score screen 1200 that displays the various shortlisted KPIs 1002 based on their respective fitment scores. The KPIs are divided into, for example, three categories based on their respective overall fitment scores. Each of the three categories is displayed under a respective tab. All the KPIs which were evaluated are displayed under the 'All KPIs' tab 1202, the KPIs which are selected or shortlisted can be shown under the 'Shortlisted KPIs' tab 1204 and the KPIs which were rejected can be shown under the 'Other KPIs' tab 1206. Each KPI is displayed within a grid 1210 where each cell of the grid 1210 can include a color coding in Red, Amber and Green (RAG) that is indicative of whether or not a KPI has cleared the threshold under the corresponding criterion. The information regarding the fitment score thresholds can be conveyed via other schemes in accordance with examples disclosed herein. The red or amber color coding can be indicative that the KPI is currently unusable. However, certain actions 1212 can be identified by the monitoring system 100 which can be viewed 1214 by the user. The actions can be identified via analyzing the data regarding the KPIs 114 from the local data store 112 and from the user comments provided for the KPI via the qualifying questionnaire 1100. The actions when implemented, enable improving the performance of the KPI for the sub-process thereby improving the fitment score under one or more criteria and changing the status of the KPI from one of red or amber to green and making the KPI eligible for use in monitoring the automation of the selected sub-process 712.

The fitment score for each KPI is obtained based on weightage assigned to the various qualifier questions under different criteria and on the user's responses to the qualifier questions. In an example, the fitment score for a given question/response pair can be calculated as 'Question Weightage*Response score'. For example, the monitoring system 100 can be configured to present four options to a user for a question 'What is the Automation impact on the variables used for calculating the KPI?' when analyzing the direct impact of the KPI. Each of the options can carry a respective score of 4, 3, 2 and 1 while the question can carry a weightage of 30%. Accordingly, the fitment score when the user selects the first option is 0.3*4=1.2.

Accordingly, five fitment scores can be thus obtained for the KPI in the example under consideration although more or less criteria can be employed in accordance with other use case scenarios. The five fitment scores are compared with respective thresholds so that the usability of the KPI under each criterion of the five criteria can be determined. An example color coding for the KPI under a particular consideration, e.g., the direct impact consideration, is outlined but it can be appreciated that other colors and fitment score ranges can be used in accordance with examples disclosed herein. A fitment score of 4-3.6 corresponds to a score of greater than 90% to map to green which makes the KPI usable, a fitment score between 2.8 to 3.6 corresponds to a score of 70-90% and places the KPI in the amber region while a score of less than 2.8 corresponds to less than 70% thereby placing the KPI in the red region.

A KPI which clears the thresholds under each of the applied criteria can be selected for usage in estimating the impact of the sub-process automation and is displayed under the shortlisted KPI 1206. The overall fitment score 1208 for each of the KPIs can be obtained as an aggregate of the fitment scores under the applied criteria. The screen 1250 displays the usable KPI when the 'Shortlisted tab' 1204 is selected. The shortlisted or usable KPIs have fitment scores that clear thresholds corresponding to each of the plurality of KPI selection criteria.

Figure 13:
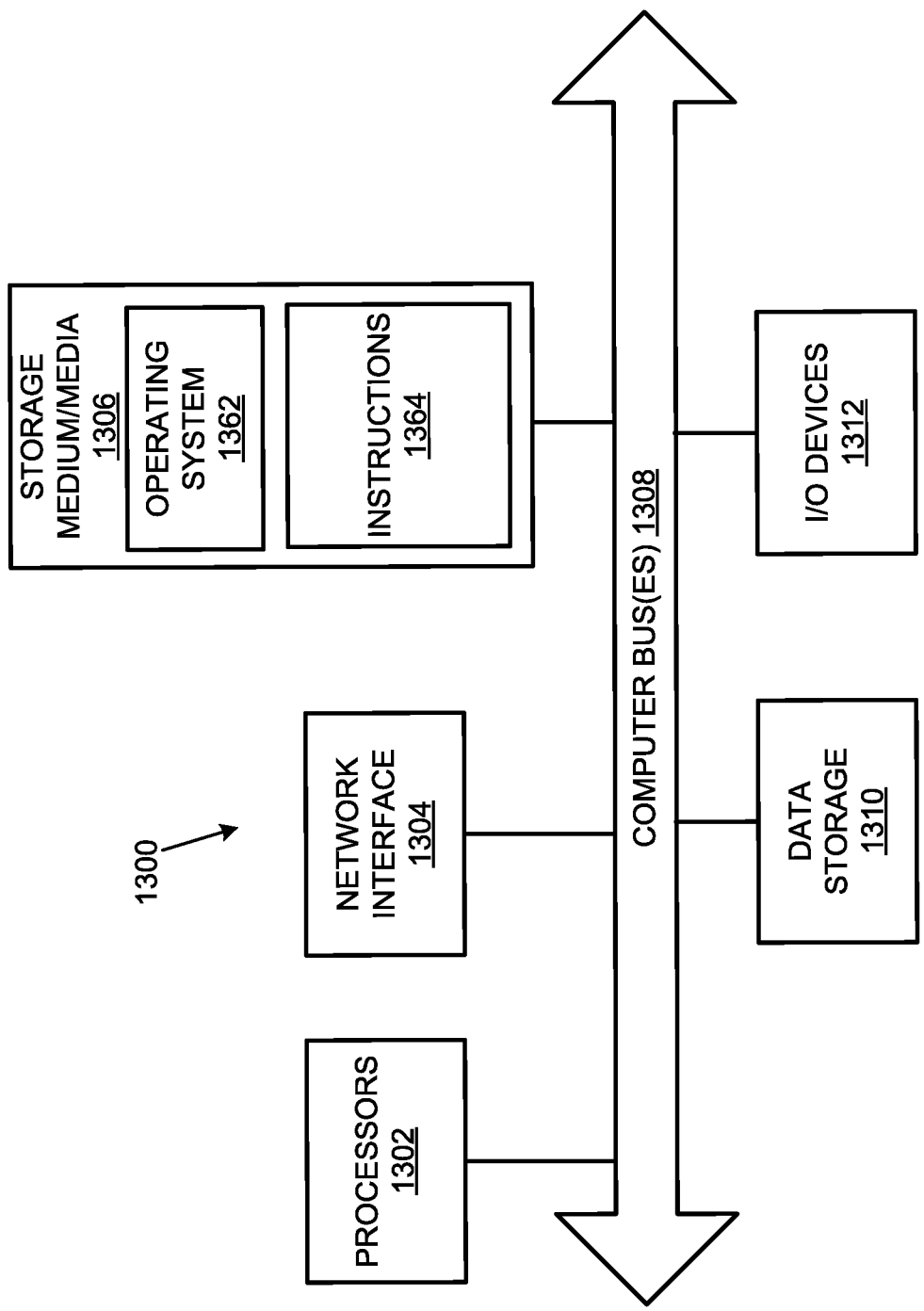
FIG. 13 illustrates a computer system that may be used to implement the process monitoring system in accordance with examples disclosed herein.

FIG. 13 illustrates a computer system 1300 that may be used to implement the monitoring system 100. More particularly, computing machines such as internal/external server clusters, desktops, laptops, smartphones, tablets and wearables which may be used to execute the monitoring system 100 or may have the structure of the computer system 1300. The computer system 1300 may include additional components not shown and that some of the components described may be removed and/or modified. In another example, a computer system can sit on external-cloud platforms such as, Amazon Web Services, or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306 (also referred to herein as storage medium/media). Each of these components may be operatively coupled to a bus 1308. The computer-readable medium 1306 may be any suitable medium which participates in providing instructions to the processor(s) 1302 for execution. For example, the computer-readable medium 1306 may be or a non-transitory computer readable medium or a non-volatile computer readable medium, such as a magnetic disk or solid-state non-volatile memory or volatile medium such as RAM. The instructions or modules stored on the computer-readable medium 1306 may include machine-readable instructions 1364 executed by the processor(s) 1302 to perform the methods and functions of the monitoring system 100.

The monitoring system 100 may be implemented as software stored on a non-transitory computer-readable medium and executed by one or more processors. For example, the computer-readable medium 1306 may store an operating system 1362, such as MAC OS, MS WINDOWS, UNIX, or LINUX, and code 1364 for the process integrity evaluation system 100. The operating system 1362 may be multi-user, multiprocessing, multitasking, multithreading, real-time and the like. For example, during runtime, the operating system 1362 is running and the code for the monitoring system 100 is executed by the processor(s) 1302.

The computer system 1300 may include a data storage 1310, which may include non-volatile data storage. The data storage 1310 stores any data used by the process integrity evaluation system 100. The data storage 1310 may be used to store the KPI master data, recommendations, user comments, fitment scores and related thresholds, questionnaires user responses, training data 250 and the like.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An artificial-intelligence (AI) based automation monitoring system comprising:
at least one processor;
at least one non-transitory computer readable medium storing machine-readable instructions that cause the at least one processor to:
receive, information related to an automated process, the information including at least an operating group and an industry associated with the automated process;
retrieve data related to one or more of a domain, an automated process and at least one sub-process of the automated process;
extract, based on the retrieved data, data regarding one or more key performance indicators (KPIs) associated with the automated process from a plurality of data sources including one or more of structured and unstructured data sources,
wherein the data regarding the one or more KPIs is extracted by implementing web scraping on one or more web-based sources of the plurality of data sources;
automatically initiate a validation of the extracted KPIs;
receive user selection of one or more of the validated KPIs;
train at least two machine learning (ML) classification models to classify the user-selected KPIs into usable and unusable subsets, wherein the at least two ML classification models are trained on training data including labeled historical data related to KPIs found usable and un-usable for a particular combination and sub-combination of the industry, the domain, the automated process and the at least one sub-process of the automated process;
generate by at least one of the at least two ML classification models, at least two subsets including at least a subset of usable KPIs and a subset of unusable KPIs by classifying the user-selected KPIs;
rank, using a ranking model, the user-selected KPIs in a descending order of usability;
provide, for each of the user-selected KPIs, an evaluation regarding usability of the KPI in determining successful automation of the automated process, the evaluation being based at least on the classification and the ranking of the user-selected KPIs;
obtain respective fitment scores for each of the user-selected KPIs;
recommend a subset of the user-selected KPIs with respective fitment scores above a threshold for monitoring an impact of an automation of the automated process;
generate recommended actions for converting at least one of the unusable KPIs to a usable KPI;
update the training data with feedback related to success rate of the recommended subset of the user-selected KPIs; and
further train the at least two ML classification models on the updated training data.

2. The artificial-intelligence-based automation monitoring system of claim 1, wherein the computer readable medium further stores machine-readable instructions that cause the at least one processor to:
receive further user responses to qualifier questions related to the user-selected KPIs; and
assign dynamically-controlled weights to the qualifier questions; and
score each of the user responses to the qualifier questions.

3. The artificial-intelligence-based automation monitoring system of claim 2, wherein the instructions to obtain the fitment scores further comprise instructions that cause the at least one processor to:
obtain the fitment score for each of the user-selected KPIs based on the weights assigned to each of the qualifier questions and the scores of the user responses.

4. The artificial-intelligence-based automation monitoring system of claim 2, wherein the computer readable medium further stores machine-readable instructions that cause the at least one processor to:

enable, via a graphical user interface (GUI), a display of the user-selected KPIs via color coding indicative of respective fitment scores.

5. The artificial-intelligence-based automation monitoring system of claim 1, wherein the KPIs are dynamic KPIs with values being updated over a period of time.

6. The artificial-intelligence-based automation monitoring system of claim 5, wherein the computer readable medium further stores machine-readable instructions that cause the at least one processor to:
periodically repeat the steps of extracting data regarding the KPIs, automatically initiating the validation of the KPIs, receiving user selection of the validated KPIs, classifying and ranking the user-selected KPIs and providing an evaluation of the user-selected KPIs.

7. The artificial-intelligence-based automation monitoring system of claim 1, wherein machine-readable instructions for extracting the data regarding the KPIs further include machine-readable instructions that cause the at least one processor to:
employ natural language processing for extracting the data regarding the KPIs from the unstructured data sources of the plurality of data sources.

8. The artificial-intelligence-based automation monitoring system of claim 1, wherein machine-readable instructions for extracting the data regarding the KPIs further include machine-readable instructions that cause the at least one processor to:
push the extracted data into a local data storage of the automation monitoring system.

9. The artificial-intelligence-based automation monitoring system of claim 1, wherein machine-readable instructions for classifying the KPIs further include machine-readable instructions that cause the at least one processor to:
evaluate a plurality of ML models including the at least two ML classification models for the classification of the user-selected KPIs into the at least two groups; and
select a highest scoring model of the plurality of ML models as the classification model.

10. The artificial-intelligence-based automation monitoring system of claim 1, wherein the plurality of ML models comprise two-class boosted decision tree, decision forest, decision jungle, logistic regression and support vector machine.

11. The artificial-intelligence-based automation monitoring system of claim 1, wherein machine-readable instructions for generating the recommended actions further include machine-readable instructions that cause the at least one processor to:
employ natural language processing (NLP) on user comments from the plurality of data sources related to the unusable KPIs;
determine, using the NLP, the recommended actions from the user comments.

12. The artificial-intelligence-based automation monitoring system of claim 11, wherein machine-readable instructions for generating the recommended actions further include machine-readable instructions that cause the at least one processor to:
employ a ML-based recommender model for the generation of the recommended actions.

13. A method of determining impact of automation of an automated process comprising:
receiving, information related to an automated process, the information including at least an operating group and an industry associated with the automated process;
retrieving data related to one or more of a domain, an automated process and at least one sub-process of the automated process;
extracting, based on the retrieved data, data regarding one or more key performance indicators (KPIs) associated with the automated process from a plurality of data sources having data of different data formats,
wherein the data regarding the one or more KPIs is extracted by implementing web scraping on one or more web-based sources of the plurality of data sources;
receiving user selection of at least one automatically validated KPI of the one or more KPIs;
training at least two machine learning (ML) classification models to classify the user-selected KPIs into usable and unusable subsets, wherein the at least two ML classification models are trained on training data including labeled historical data related to KPIs found usable and un-usable for a particular combination and sub-combination of the industry, the domain, the automated process and the at least one sub-process of the automated process;
generating by at least one of the at least two ML classification models, at least two subsets including at least a subset of usable KPIs and a subset of unusable KPIs by classifying the user selected KPIs, the usable KPIs being selected for use in determining the impact of automation on the automated process;
ranking, using a trained ranking model, the user-selected KPIs from each of the subset of usable KPIs and the subset of unusable KPIs in a descending order of usability;
providing, for each of the user-selected KPIs, an evaluation regarding usability of the KPI in determining successful automation of the automated process, the evaluation being based at least on the classification, the ranking of the user-selected KPIs and sentiment analysis of the data regarding the user-selected KPIs; and
determining respective fitment scores for each of the user selected KPIs under a plurality of KPI selection criteria based on dynamically controlled weights assigned to questions related to each of the user selected KPIs under the plurality of KPI selection criteria;
recommending a subset of the user-selected KPIs with respective overall fitment scores above a threshold for monitoring an impact of an automation of the automated process;
generating recommended actions for converting at least one of the unusable KPIs to a usable KPI;
updating the training data with feedback related to success rate of the recommended subset of the user-selected KPIs; and
further training the at least two ML classification models on the updated training data.

14. The method of claim 13, wherein generating the at least two subsets using the at least one ML classification model-further comprises:
testing at least the two ML classification models; and
employing a best scoring ML classification model of the at least two ML classification models for the generation of the at least two subsets.

15. The method of claim 13, wherein the trained ranking model implements one of bipartite ranking, k-partite ranking and general instance ranking.

16. A non-transitory device storage medium comprising machine-readable instructions that cause a processor to:

receive, information related to an automated process, the information including at least an operating group and an industry associated with the automated process;
retrieve data related to one or more of a domain, a process and a sub-process of the automated process;
  extract, based on the retrieved data, data regarding one or more key performance indicators (KPIs) associated with the automated process from a plurality of data sources including one or more of structured and unstructured data sources, wherein the data regarding the one or more KPIs is extracted by implementing web scraping on one or more web-based sources of the plurality of data sources;
automatically initiate a validation of the extracted KPIs;
receive user selection of one or more of the validated KPIs;
train at least two machine learning (ML) classification models to classify the user-selected KPIs into usable and unusable subsets, wherein the at least two ML classification models are trained on training data including labeled historical data related to KPIs found usable and un-usable for a particular combination and sub-combination of the industry, the domain, the automated process and the at least one sub-process of the automated process;
generate by at least one of the at least two ML classification models, at least two subsets including at least a subset of usable KPIs and a subset of unusable KPIs by classifying the user-selected KPIs;
rank, using a ranking model, the user-selected KPIs in a descending order of usability;
provide, for each of the user-selected KPIs, an evaluation regarding usability of the KPI in determining successful automation of the automated process, the evaluation being based at least on the classification and the ranking of the user-selected KPIs; and
recommend a subset of the user-selected KPIs with respective fitment scores above corresponding thresholds for monitoring an impact of an automation of the automated process;
generate recommended actions for converting at least one of the unusable KPIs to a usable KPI;
update the training data with feedback related to success rate of the recommended subset of the user-selected KPIs; and
further train the at least two ML classification models on the updated training data.

17. The non-transitory device storage medium of claim 16, wherein two-class algorithms are implemented by the classification model.

18. The non-transitory device storage medium of claim 16, comprising further machine-readable instructions that cause a processor to:
  generate, using NLP, the recommended actions for one or more of the user-selected KPIs with respective fitment scores below the corresponding thresholds, the recommended actions being generated from user responses to a set of questionnaires presented with the evaluations.

* * * * *